Patented June 24, 1941

2,246,937

UNITED STATES PATENT OFFICE 2,246,937

POLYMERIZATION OF DIOLEFINS

Henri Martin Guinot, Niort, France, assignor to Les Usines de Melle, Melle, (Deux-Sevres), France, a joint-stock company of France No Drawing. Application August 28, 1939, Serial No. 292,363. In France September 16, 1938

12 Claims. (Cl. 260—93)

The present invention relates to the polymerisation of diolefins, whereby products of the nature of synthetic rubber and resins can be obobtained. Butadiene is of primary interest in this connection.

It is known that the diolefins may be polymerised either directly or in the form of aqueous dispersions by treatment with the aid of catalysts. It is also known that these catalysts may be either mineral oxidising agents, such as aqueous hydrogen peroxide, persulphates, perborates, peroxides such as barium peroxide, or organic oxidising agents such as ozonides, benzoyl peroxide and acid anhydrides.

Now it has been discovered that the peroxides of tetrahydro-furfurane, or its homologues form excellent catalysts for the polymerisation of the diolefins. Of these substances the peroxide of methyl-tetrahydro furfurane has been found to be a singularly effective catalyst.

The process of polymerising diolefins according to the present invention, therefore, consists in effecting this polymerisation catalytically with the aid of a peroxide of tetrahydro-furfurane, or its homologues, as a catalyst.

These peroxides may be used in the pure state, but it has been observed that it is advantageous to use them in solution in the tetrahydro-furfurane or the tetrahydro-furfurane homologue from which they have been formed, because, in this diluted condition, they act in a manner which is at once less violent and more complete.

Such solutions may easily be obtained by careful oxidation of tetrahydro-furfurane, or its homologues, either with an aqueous solution of hydrogen peroxide, for example, or even by simply exposing them to the air. In fact tetrahydro furfurane and its homologues oxidise spontaneously in the air and are partly converted into the corresponding peroxide, the presence of which is easily detected by means of potassium iodide. Thus after remaining exposed to the air for four months, in a flask with a wide opening, a litre of methyl-tetrahydro-furfurane spontaneously absorbs about a molecule of oxygen, or twenty times its own volume. Such a solution is particularly well suited for the purposes of the present invention. It may, if necessary, be submitted to a preliminary concentration by evaporation in contact with air and under slightly reduced pressure. In industrial practice, this partial oxidation of the methyl-tetrahydro-furfurane will be accelerated by stirring it in the air or in an oxidising atmosphere.

The following non-limitative examples will make it easily understood how the process of the present invention may be carried into practice.

Example 1

Methyl tetrahydro furfurane is vigorously stirred in an atmosphere of oxygen, under a pressure of 10 kilos per cm$^2$. After 24 hours it is observed that the methyl-tetrahydro-furfurane has absorbed 50 times its volume of oxygen.

1 cc. of this peroxidised solution is added to a dispersion of 100 cc. of butadiene in a solution of dextrine to which sodium carbonate, sodium sulforicinate and sodium palmitate, have been added. After remaining for 60 hours in the cold, 90% of the butadiene is polymerised into a resin having excellent plastic qualities.

Example 2

Methyl-tetrahydro-furfurane is stirred for 5 hours with 50 volume aqueous hydrogen peroxide and it is thus made to absorb 25 times its volume of oxygen.

0.5 cc. of the peroxidised solution thus obtained is added to 20 cc. of methyl butadiene. At the end of 72 hours at 40° C., the methyl butadiene is almost totally polymerised.

It may be advantageous to work with hot solutions since it has been found that an increase in temperature gives a considerable acceleration of the reaction, as the following example shows.

Example 3

100 cc. of dispersion of butadiene prepared as in Example 1, and 2 cc. of peroxidised methyl-tetrahydro-furfurane obtained as in Example 2 are placed in a closed vessel which is capable of resisting pressure; the mixture is raised to a temperature of 80° C., corresponding to a pressure of 12 kilos per cm$^2$. It is observed that after only 4 hours of contact, 80% of the butadiene used, is polymerised.

Although the above examples relate particularly to the use of methyl-tetrahydro-furfurane peroxide which is remarkably active, the invention may also be carried out with tetrahydro furfurane peroxide or with its other higher homologues. All these peroxides are obtained as easily, and in the same manner, as methyl-tetrahydro-furfurane peroxide.

The use of the peroxides which have been referred to above as catalysts for the polymerisation of the diolefins, forms an important improvement as compared with previously known processes. On one hand, their action is much more energetic than that of the products previously described, and on the other hand the polymerising reagent may be obtained, as has been seen, with the greatest ease and without any danger, whereas the majority of the organic peroxides previously used require very delicate operations for their preparation.

What I claim is:

1. A process for the catalytic polymerization of diolefins in which there is used as a catalyst a peroxide selected from the group consisting of the peroxides of tetrahydro-furfurane and its homologues.

2. A process for the catalytic polymerization of diolefins in which there is used as a catalyst a peroxide selected from the group consisting of the peroxides of tetrahydro-furfurane and its homologues, said peroxide being employed in solution in the furfuranic compound from which it has been derived.

3. A process for the catalytic polymerization of diolefins in which there is used as a catalyst a peroxide selected from the group consisting of the peroxides of tetrahydro-furfurane and its homologues, said peroxide being formed by partial oxidation of the appropriate furfuranic compound carried out by prolonged stirring of said furfuranic compound in the presence of a gas containing oxygen.

4. A process for the catalytic polymerization of diolefins in which there is used as a catalyst a peroxide selected from the group consisting of the peroxides of tetrahydro-furfurane and its homologues, said peroxide being formed by partial oxidation of the appropriate furfuranic compound carried out by treatment with an oxidising agent.

5. A process for the catalytic polymerization of diolefins in which the peroxide of methyl tetrahydro-furfurane is used as a catalyst.

6. A process for the catalytic polymerization of diolefins which is carried out at a temperature between 20–100° C. and in which the peroxide of methyl tetrahydro-furfurane is used as a catalyst.

7. A process for the catalytic polymerization of diolefins which is carried out between 20–100° C. and in which there is used as a catalyst a peroxide selected from the group consisting of the peroxide of tetrahydro-furfurane and its homologues.

8. A process for the catalytic polymerization of diolefins which is carried out at superatmospheric pressure and in which there is used as a catalyst a peroxide selected from the group consisting of the peroxide of tetrahydro-furfurane and its homologues.

9. A process for the catalytic polymerization of diolefins which is carried out at superatmospheric pressure and at a temperature between 20–100° C. and in which there is used as a catalyst a peroxide selected from the group consisting of the peroxides of tetrahydro-furfurane and its homologues.

10. A process for producing products of the nature of synthetic rubber and resins which comprises catalytically polymerizing diolefins and using as a catalyst a peroxide selected from the group consisting of the peroxides of tetrahydro-furfurane and its homologues.

11. A process for the catalytic polymerization of diolefins as claimed in claim 3, wherein the gas containing oxygen is air.

12. A process for the catalytic polymerization of diolefins as defined in claim 4 in which the oxidising agent is hydrogen peroxide.

HENRI MARTIN GUINOT.